United States Patent [19]

Yoshikawa

[11] Patent Number: 5,140,612

[45] Date of Patent: Aug. 18, 1992

[54] MODEM FOR USE IN A DATA COMMUNICATION SYSTEM

[75] Inventor: Syuuichi Yoshikawa, Nara, Japan

[73] Assignee: Sharp Kabushiki Kaisha, Osaka, Japan

[21] Appl. No.: 631,169

[22] Filed: Dec. 20, 1990

[30] Foreign Application Priority Data

Dec. 29, 1989 [JP] Japan .................. 1-341889

[51] Int. Cl.5 .............................. H04B 1/38
[52] U.S. Cl. ........................... 375/8; 358/445
[58] Field of Search ............. 375/7, 8; 358/444, 445, 358/438, 468

[56] References Cited

U.S. PATENT DOCUMENTS

| 4,635,132 | 6/1987 | Nakamura | 358/438 |
| 4,677,645 | 6/1987 | Kaniwa et al. | 375/8 |
| 4,931,250 | 6/1990 | Greszczuk | 375/8 |

FOREIGN PATENT DOCUMENTS

| 0378037 | 7/1990 | European Pat. Off. | 375/8 |
| 0136326 | 6/1986 | Japan | 375/8 |
| 1-177251 | 7/1989 | Japan | . |
| 0122754 | 5/1990 | Japan | 375/8 |

Primary Examiner—Benedict V. Safourek
Assistant Examiner—Young Tse

[57] ABSTRACT

In a data communication system, a modem for recording and reproducing audio tone data in addition to picture data includes an A/D converter, a D/A converter, and a digital modem section for demodulating the digital data outputted from the A/D converter and for modulating the digital demodulated data to be transmitted to the D/A converter. The system further includes a coding-decoding section for coding the digital data outputted from the A/D converter and for decoding the digital coded data to be transmitted to the D/A converter. The A/D and D/A converters are used in common for both the digital modem section and the coding-decoding section.

10 Claims, 3 Drawing Sheets

MODEM FOR USE IN A DATA COMMUNICATION SYSTEM

BACKGROUND OF THE INVENTION

1. Field of the Invention

The present invention relates to a modem, in particular to a modem adaptive for a data recording and reproducing system provided in a data communication system such as in a telephone service.

It is noted that a modem is a combination of a modulator and a demodulator at each end of a telephone line to convert binary digital data to audio tone signals suitable for transmission over the line, and vice versa, which is also known as data-set.

2. Description of the Related Art

It is a common practice to provide a modem in a data communication equipment such as a facsimile system for data transmission via wire or radio communication lines. On the other hand, there has been developed LSI (large scale integration) for recording and reproduction of data, which is employed in a data communication system such as a caretaker telephone system for recording and reproducing audio tone or sound data. In recent years, in a facsimile system there is accommodated LSI for recording and reproducing audio tone data for transmission of the data.

FIG. 1 shows a schematic construction of a conventional facsimile system F having such an audio tone data recording and reproducing faculty using a modem and LSI. In such a conventional facsimile system, as shown in FIG. 1, there is provided a line control unit (referred to as LCU hereinafter) 11 having telephone lines 10 and 10' connected thereto, and telephone equipment 12 is connected to the LCU 11 through the telephone line 10'. The LCU 11 is connected to a data recording and reproducing LSI 20 for recording and reproducing audio tone data through a bus line and is also connected to a modem 30 through another bus line.

In the modem 30, there are accommodated analogue-to-digital (referred to as A/D hereinafter) and digital-to-analogue (referred to as D/A hereinafter) converters 30a and 30b. When picture data signals of analogue form are transmitted to the facsimile through the telephone line 10, the received analogue data signals of the picture data are A/D converted through the A/D converter 30a, thereafter the digital picture data are demodulated in the modem 30 and the demodulated digital data are transmitted to a data bus 13. The data bus 13 has a microprocessor 14, a memory unit 15 and a picture reading and recording unit 16 connected thereto. The digital picture data outputted onto the bus 13 from the modem 30 are temporarily stored in the memory unit 15 under the control of the microprocessor 14. Subsequently, the picture data stored in the memory unit 15 are sequentially read out to be transmitted to the picture reading and recording unit 16 in which the picture data are recorded. On the contrary, when picture data are transmitted from the facsimile used as transmitting equipment, the digital picture data recorded in the picture reading and recording unit 16 are read out onto the bus 13 and temporarily stored in the memory unit 15. Subsequently, the digital picture data stored in the memory unit 15 are sequentially read out and transmitted to the modem 30 through the bus line 13. The digital picture data are modulated in the modem 30 into data signals suitable for the transmission of the picture data, thereafter the modulated digital picture data are D/A converted through the D/A converter 30b. The analogue picture data outputted from the D/A converter 30b are transmitted onto the telephone line 10 via the LCU 11.

Also in the LSI 20 for recording and reproducing audio tone data, there are provided A/D and D/A converters 20a and 20b. When audio tone data signals of analogue form are transmitted from the telephone equipment 12 to the facsimile through the telephone line 10', the input analogue data signals are applied to the A/D converter 20a of the LSI 20 through the LCU 11 and A/D converted through the A/D converter 20a. The A/D converted signals are coded in the LSI 20. The coded digital audio tone data signals are outputted from the LSI 20 onto the bus line 13 and stored in the memory unit 15 under the control of the microprocessor 14. The digital audio tone data stored in the memory unit 15 are read out and transmitted to the LSI 20 under the control of the microprocessor 14 when required. The digital audio tone data applied to the LSI 20 from the memory unit 15 are decoded in the LSI 20 and D/A converted through the D/A converter 20b, thereby recovering the original analogue audio tone data. Subsequently, the D/A converted audio tone data signals are outputted from the D/A converter 20b and transmitted onto the telephone line 10 or to the telephone equipment 12 for hearing through the LCU 11.

As described above, in the conventional data communication equipment such as a facsimile, when an audio tone data recording and reproducing function is provided in addition to the picture data communication function in the data communication equipment, it is required to provide the LSI 20 for recording and reproducing the audio tone data in addition to the modem 30. That is to say, it is required to provide a modem 30 an and LSI 20 individually having a pair of A/D and D/A converters respectively in the data communication equipment. Accordingly, it becomes difficult to reduce the size and cost of the equipment.

SUMMARY OF THE INVENTION

The present invention has been made from the viewpoint to solve the problem mentioned above, and an essential object of the present invention is to provide a modem device for use in a data communication equipment such as a facsimile system facilitating to reduction of the size and lowering the cost of the equipment even when an audio tone data recording and reproducing function is provided in the equipment in addition to the picture data communication faculty.

In order to attain the object mentioned above, the modem device of the present invention comprises a pair of A/D and D/A converters arranged in the transmission section thereof, a digital modem section connected to the A/D and D/A converters, and a coding-decoding section connected to the A/D and D/A converters.

In an embodiment of the modem device of the present invention, the coding-decoding section is provided for processing audio tone data signals.

According to a feature of the modem device of the present invention, the digital modem section demodulates the digital signals outputted from the A/D converter located in the transmission section of the modem device. On the contrary, the digital signals modulated in the digital modem section are transmitted to the D/A converter in which the modulated digital signals are D/A converted. The coding-decoding section codes the digital signals of audio tone data outputted from the A/D converter in which the received audio tone data of analogue form are A/D converted. On the contrary, the digital signals of the audio tone data decoded by the coding-decoding section are transmitted to the D/A converter in which the digital audio tone data are D/A converted. In such a manner as described above, in the modem device of the present invention, a pair of A/D and D/A converters are used in common for both the digital modem section and the coding-decoding section.

Other advantages and features of the present invention will be apparent from the description and drawings herein of a preferred embodiment thereof.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

A preferred embodiment of the present invention is now described hereinafter with reference to the attached drawings.

Figure 1:
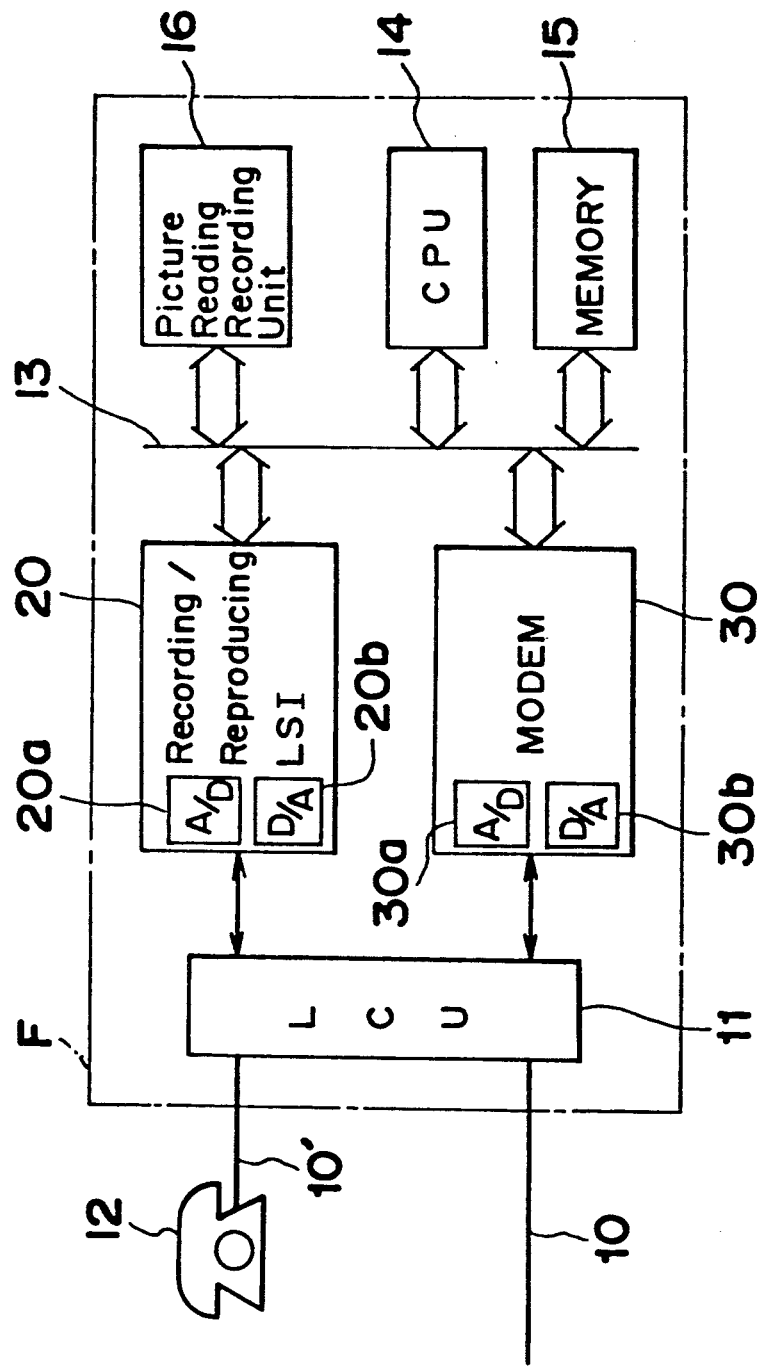
FIG. 1 is a block diagram showing an example of a facsimile system using a conventional modem.
Figure 2:
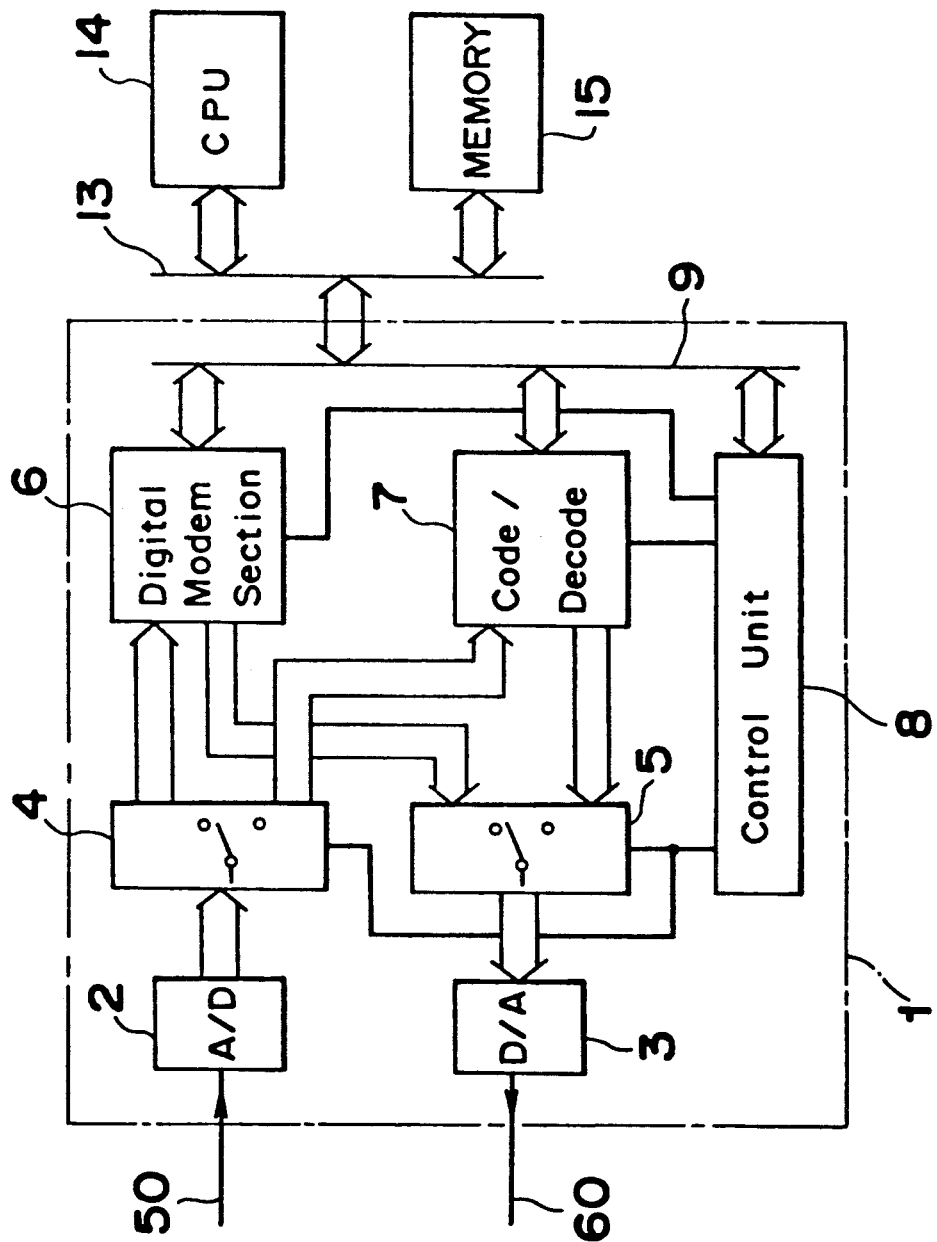
FIG. 2 is a block diagram showing an embodiment of a modem according to the present invention.

FIG. 2 shows a preferred embodiment of the present invention, wherein a modem device 1 includes an A/D converter 2 having a data input line 50 connected thereto, a D/A converter 3 having a data output line 60 connected thereto, an input switching unit 4, an output switching unit 5, a digital modem section 6, a coding-decoding section 7 and a control unit 8.

When the modem device 1 receives audio tone data or picture data signals of analogue form transmitted via the data input line 50, the analogue input data signals are applied to the A/D converter 2 in which the applied analogue data are A/D converted. The digital data outputted from the A/D converter 2 are applied to the input switching unit 4. The switching operation of the input switching unit 4 is controlled by the control unit 8. When the received data are modulated signals such as picture data signals, the input switching unit 4 is so controlled that the digital data applied to the input switching unit 4 are transferred to the digital modem section 6. When the received data are baseband signals such as audio tone data signals, the input switching unit 4 is so controlled that the applied digital data are transferred to the coding-decoding section 7 through the input switching unit 4 under the control of the control unit 8.

On the contrary, when the data are transmitted out of the modem device 1 onto the data output line 60, the output switching unit 5 is so controlled as to receive digital data signals from the digital modem section 6 or the coding-decoding section 7 switchedly therebetween under the control of the control unit 8, and the output digital data of the output switching unit 5 are transmitted to the D/A converter 3. The applied digital data are D/A converted through the D/A converter 3 and the D/A converted signals are outputted onto the data output line 60. The digital modem section 6 and the coding-decoding section 7 are also controlled by the control unit 8. The digital modem section 6, the coding-decoding section 7 and the control unit 8 are connected onto an internal bus line 9 provided in the modem device 1. The internal bus line 9 is connected to an external bus line 13 provided outside the modem device 1, the bus line 13 having a microprocessor 14 and a memory unit 15 connected thereto.

When the received data signals are applied to the modem device 1, there are two cases depending on whether or not the microprocessor 14 has information for judging what kind of signals the received data signals are, for example, whether the received signals are a kind of modulated signals such as picture data signals or baseband signals such as audio tone signals transmitted in telephone network service.

In the case where the microprocessor 14 has information for judging the kind of the received signals, the microprocessor 14 sends instructions to the control unit 8 for selecting whether the received signals should be processed in the digital modem section 6 or in the coding-decoding section 7.

When the digital modem section 6 is selected for processing modulated received signals such as picture data signals based on the instructions sent by the microprocessor 14, the digital signals outputted by the A/D converter 2 are applied to the digital modem section 6 through the input switching unit 4. In the digital modem section 6, the applied digital signals are appropriately demodulated, and the demodulated signals outputted from the digital modem section 6 are transmitted to the memory unit 15 through the bus lines 9 and 13 and stored in the memory unit 15 under the control of the microprocessor 14.

When the coding-decoding section 7 is selected for processing the received baseband signals such as audio tone data signals, the received signals, such as audio tone data signals, are A/D converted through the A/D converter 2 and transmitted to the coding-decoding section 7 through the input switching unit 4 under the control of the control unit 8. In the coding-decoding section 7, the applied digital data signals are coded for compressing the quantity of the data in a code modulation way such as ADPCM (Adaptive Differential PCM), wherein it is noted that PCM means a pulse code modulation, i.e., modulation in which the peak-to-peak amplitude range of the signal to be transmitted is divided into a number of standard values, each having its own three-place code. Each sample of the signal is then transmitted as the code for the nearest standard amplitude. The coded digital data outputted from the coding-decoding section 7 are transmitted to the memory unit 15 through the bus lines 9 and 13 and stored in the memory unit 15 under the control of the microprocessor 14.

When the microprocessor 14 has no information for judging the kind of the input received signals, it is required to provide a process for judging the kind of the input received signals in a manner as follows.

The analogue received signals are A/D converted through the A/D converter 2 and transmitted to the digital modem section 6 through the input switching unit 4. It is judged in the digital modem section 6 whether the applied digital signals are to be demodulated or not in such a manner as detecting carrier signals. The judging result obtained in the digital modem section 6 is transmitted to the control unit 8. The control unit 8 controls the input switching unit 4 based on the judging result transmitted from the digital modem section 6, thereby selecting the operation of either the digital modem section 6 or the coding-decoding section 7.

When the data are transmitted out of the modem device 1 onto the output line 60, the instruction signal is transmitted from the microprocessor 14 to the control unit 8 to control the output switching unit 5 for selecting either the digital modem section 6 or the coding-decoding section 7 for processing the data to be outputted. The digital data stored in the memory unit 15 are read out and transmitted to either the digital modem section 6 or the coding-decoding section 7 through the bus lines 13 and 9. When the digital modem section 6 is selected for processing the demodulated digital data such as picture data read out of the memory unit 15, the demodulated digital data are modulated in the digital modem section 6. Thereafter, the modulated digital data are transmitted from the digital modem section 6 to the D/A converter 3 through the output switching unit 5.

On the other hand, when the coding-decoding section 7 is selected for processing the coded digital data read out of the memory unit 15, the coded digital data are decoded in the coding-decoding section 7 for extending the compressed quantity of the data. The decoded digital data are transmitted from the coding-decoding section 7 to the D/A converter 3 through the output switching unit 5 and the decoded digital data are D/A converted through the D/A converter 3. Thereafter, the analogue data outputted from D/A converter 3 are transmitted onto the output line 60.

As described above, the embodiment of the modem device 1 according to the present invention can be utilized for recording and reproducing audio tone data in addition to ordinary data communication such as picture data communication.

According to the embodiment of the present invention, a pair of the A/D and D/A converters 2 and 3 are used in common for both the digital modem section 6 and the coding-decoding section 7. Therefore, the entire part of the modem device 1 can be miniaturized to form an LSI, thereby reducing the production cost thereof.

In this embodiment, although the input and output switching units 4 and 5 are provided in the modem device 1, it is not always required to provide the switching units 4 and 5. By appropriately controlling the control unit 8 in such a manner that either the digital modem section 6 or the coding-decoding section 7 is selected for processing the data depending on the kind of the data, the input and output switching units 4 and 5 can be omitted.

Figure 3:
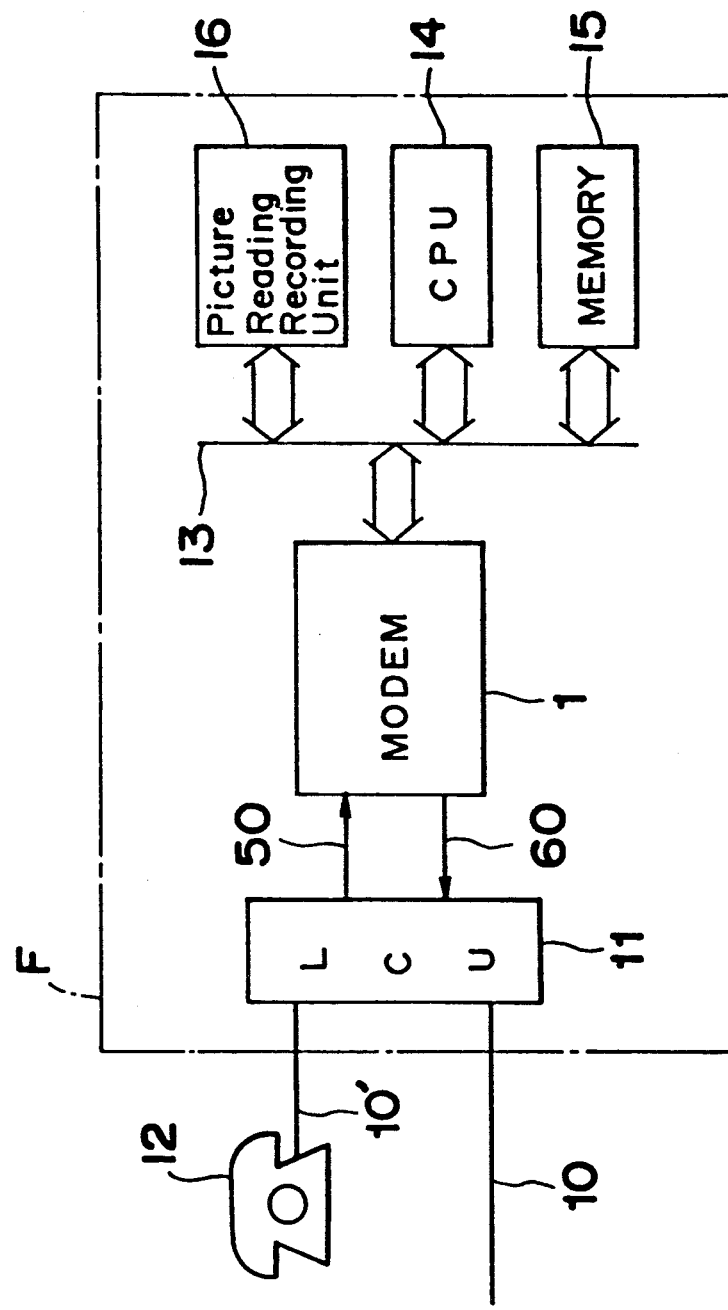
FIG. 3 is a block diagram showing an example of a facsimile system employing the embodiment of the modem shown in FIG. 2.

FIG. 3 shows a block diagram of a facsimile system F employing the modem device 1 shown in FIG. 2. The LCU 11 has telephone lines 10 and 10' connected thereto. Other subscriber telephone stations are connected to the LCU 11 through the telephone line 10 and a telephone 12 is connected to the LCU 11 through the line 10'. Also, the LCU 11 is connected to the modem device 1 through the input and output lines 50 and 60. Similarly to the modem device 1 shown in FIG. 2, the modem device 1 shown in FIG. 3 is connected to an external bus line 13 having a microprocessor 14, a memory unit 15 and a picture reading and recording unit 16 connected thereto. By taking advantage of the recording and reproduction supporting function of the modem device 1, there can be provided functions (1) and (2) in addition in the facsimile system as following:

(1) Audio tone message data can be transmitted from the telephone 12 to the facsimile through the line 10'. The applied data are coded in the modem device 1 and the quantity of the data is compressed, thereafter the coded data are stored in the memory unit 15 through the bus line 13. When the facsimile receives calling signals transmitted from other subscriber stations through the telephone line 10, the LCU 11 is switched to connect the modem device 1 to the telephone line 10. Thereafter, the coded data of the audio tone message stored in the memory unit 15 are read out and transmitted to the modem device 1 under the control of the microprocessor 14 and are decided to the original audio tone message in the modem device 1. The decoded original audio tone message data are outputted from the facsimile onto the telephone line 10.

(2) When the facsimile receives the calling signals transmitted from other subscriber stations through the telephone line 10, the received calling signals are applied to the modem device 1 in which it is judged whether or not the other subscriber stations connected through the line 10 are facsimiles. When the other subscriber stations connected through the line 10 are not facsimiles, on the assumption that the input received signals are audio tone data, the received signals are coded in the modem device 1 and stored in the memory unit 15. Alternatively, it is also possible to ring a call bell of the telephone 12.

The present invention has further embodiments and other advantages that the modem device 1 can be adapted for not only a facsimile system as shown in FIG. 3 but also various data communication equipment. In addition, the memory unit for storing the data transmitted from the modem device 1 can be controlled under the control of an external host microprocessor. Therefore, any type of memory unit such as an IC card or a floppy disc can be employed for storing the data other than IC-RAM. Furthermore, it becomes possible to reproduce the recorded data at a high speed by varying the sampling speed and to protect the recorded data by selecting an appropriate coding method.

Thus, according to the modem of the present invention, because a pair of the A/D and D/A converters are used in common for both the modem section and the coding-decoding section, the modem can be miniaturized easily for reducing the cost thereof. Therefore, it becomes possible to provide a modem with a recording and reproducing function added in a low cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A modem for data recording and reproducing in a data communication system, comprising:
   a data input line for receiving analogue signals;
   A/D converting means for converting said analogue signals received by said data input line to digital data;
   D/A converting means for converting said digital data to analogue output signals so as to be transmitted out of said modem on a data output line;

digital modem means for demodulating said digital data outputted from said A/D converting means and for modulating the digital demodulated data to be transmitted to said D/A converting means; and coding-decoding means for coding said digital data outputted from said A/D converting means and for decoding the digital coded data to be transmitted to said D/A converting means;

said A/D and D/A converting means being used in common for both said digital modem means and said coding-decoding means.

2. The modem as claimed in claim 1, further comprising selecting means for selecting between said digital modem means and said coding-decoding means for processing said digital data, wherein, when said analogue signals received by said data input line comprise modulated picture data signals, said digital modem means is selected for demodulating said digital data outputted from said A/D converting means, and when said analogue signals received by said data input line comprise baseband signals of audio tone data, said coding-decoding means is selected for coding said digital data outputted from said A/D converting means.

3. The modem as claimed in claim 2, wherein, when said modulated picture data signals that have been demodulated by said digital modem means are transmitted out of said modem, said digital modem means is selected by said selecting means so that said modulated picture data signals outputted from said digital modem means are applied to said D/A converting means, and when said audio tone data coded by said coding-decoding means are transmitted out of said modem, said coding-decoding means is selected by said selecting means so that the decoded signals of said audio tone data outputted from said coding-decoding means are applied to said D/A converting means.

4. The modem as claimed in claim 3, wherein, when the picture data signals are transmitted out of said modem, said digital modem means is selected by said selecting means and the demodulated digital picture data are read out of memory means so as to be modulated in said digital modem means and transmitted to said D/A converting means, and when said audio tone data are transmitted out of said modem, said coding-decoding means is selected by said selecting means and the coded digital audio tone data are read out of said memory means so as to be decoded in said coding-decoding means and transmitted to said D/A converting means.

5. The modem as claimed in claim 1, wherein said digital modem means further comprises judging means for judging the kind of said analogue signals received as to whether said digital data from said analogue signals received and applied to said digital modem means are to be demodulated or not, and thereby selecting between the operation of said digital modem means and said coding-decoding means for processing said digital data.

6. A data communication system for recording and reproducing audio tone data and picture data, comprising:

a data input line for receiving analogue signals;
modem means for modulating and demodulating said analogue signals received by said data input line into digital data, said modem means including,
A/D converting means for converting said analogue signals received by said data input line into said digital data,
D/A converting means for converting said digital data to analogue output signals to be transmitted out of said modem on a data output line,
digital modem means for demodulating said digital data transmitted from said A/D converting means and for modulating the demodulated data to be transmitted to said D/A converting means, and
coding-decoding means for coding said digital data transmitted from said A/D converting means and for decoding the digital coded data to be transmitted to said D/A converting means;
memory means for storing the demodulated and coded digital data; and
means for reading and recording picture data.

7. The data communication system as claimed in claim 6, further comprising judging means for judging the kind of said analogue signals received as to whether said analogue signals received comprise modulated picture data signals or baseband audio tone signals.

8. The data communication system as claimed in claim 7, wherein, when said judging means judges said analogue signals received comprise modulated picture data signals, said digital modem means is selected for demodulating said modulated picture data signals transmitted from said A/D converting means as digital data, whereby said digital data demodulated and outputted from said digital model means are stored in said memory means.

9. The data communication system as claimed in claim 8, wherein, when said judging means judges said analogue signals received comprise baseband signals of audio tone data signals, said coding-decoding means is selected for coding said audio tone data signals transmitted from said A/D converting means as digital data, whereby said digital data coded and outputted from said coding-decoding means are stored in said memory means.

10. The data communication system as claimed in claim 6, wherein said memory means comprises an IC-RAM.

* * * * *